United States Patent [19]
Kober

[11] Patent Number: 5,949,758
[45] Date of Patent: Sep. 7, 1999

[54] BANDWIDTH RESERVATION FOR MULTIPLE FILE TRANSFER IN A HIGH SPEED COMMUNICATION NETWORK

[75] Inventor: Thomas Kober, Bacharach, Germany

[73] Assignee: International Business Machines Corporation, Armonk, N.Y.

[21] Appl. No.: 08/868,160

[22] Filed: Jun. 3, 1997

[30] Foreign Application Priority Data

Jun. 27, 1996 [EP] European Pat. Off. ............ 96110365

[51] Int. Cl.⁶ .......................... G01R 31/08; H04L 12/28
[52] U.S. Cl. ......................... 370/232; 370/234; 370/395
[58] Field of Search .................... 370/252, 230, 370/232, 233, 234, 468, 469, 395, 397

[56] References Cited

U.S. PATENT DOCUMENTS

| 5,289,462 | 2/1994 | Ahmadi et al. | 370/60.1 |
| 5,636,212 | 6/1997 | Ikeda | 370/233 |
| 5,848,055 | 12/1998 | Fdyk et al. | 370/228 |

*Primary Examiner*—Michael Horabik
*Assistant Examiner*—Binyam Tadesse

*Attorney, Agent, or Firm*—Kenneth A. Seaman

[57] ABSTRACT

A method and device for transmission of data units over a communication network, particularly over a network where data units are transmitted with constant bit rate. Bandwidth reservation is optimized in the communication network for more than one file transfer within a greater time period between two dedicated end systems, running automatically without needing user interaction. The bandwidth is controlled by characterizing a given transmission path with an optimal bandwidth learned from characterization results. Based on observations of a data path during transmission phase, for instance by a packet trace, the bandwidth used and level of utilization are determined and an optimal bandwidth is stored in memory and used for a next file transfer to the same end system. The advantage of the optimization procedure is high throughput, i.e., short delay, by keeping a high bandwidth utilization with regard to low overallocation. The user does not have to estimate a vague value for the bandwidth reservation. Additionally, the system is adaptive so that a new optimal bandwidth occurs after a reconfiguration.

7 Claims, 3 Drawing Sheets

BULK RATE DETERMINATION:

OVERVIEW: ↓      DETAIL: ↓

```
┌─────────────────────────┐    ┌─────────────────────────┐   α MAY SOMEWHAT
│ FIND BEGIN OF REAL BULK │    │ FIND SECOND S_{F,l} > α*MTU │   AROUND 0.8, MTU IS
└─────────────────────────┘    │ => t_{F,start}          │   THE MAXIMUM
                               └─────────────────────────┘   TRANSMISSION UNIT,
                                                             THE FIRST BIG PACKET
                                                             SHOULD BE NEGLECTED
                                                             (START-UP PHASE)
```

$$\text{FIND BEGIN OF REAL BULK} \rightarrow \text{FIND SECOND } S_{F,l} > \alpha^*MTU \Rightarrow t_{F,\text{start}}$$

$$\text{FIND END OF BULK} \rightarrow \text{FIND LAST } S_{F,r} > \alpha^*MTU \Rightarrow t_{F,\text{stop}}$$

CHECK FOR RETRANSMISSION STOPS IN BULK:
 CLEAN PACKET TRACE BY REMOVING THE TIME GAPS

→

DO FOR WHOLE FORWARD BULK:
 $\Delta t = t_i - t_{i-1}$
 if $(\Delta t > \beta^* \overline{\Delta t})$
  for $(j >= i) t_j = t_j - \Delta t + \beta^* \overline{\Delta t}$
  $t_{stop} = t_{stop} - \Delta t + \beta^* \overline{\Delta t}$ LIMIT THE MAXIMUM TIME DIFFERENCE BETWEEN PACKETS IN BULK TO e.g. $\beta = 5$ CALCULATE THE MEAN RATE OVER THE CLEANED BULK TIME
=> $r_{\text{bulk rate}}$ $$r_{\text{bulk rate}} = \frac{\Sigma_{i=(1,r-1)} S_{F,i}}{t_{F,\text{stop}} - t_{F,\text{start}}}$$

FIG. 4

REVERSE RATE DURING BULK:

OVERVIEW: ↓      DETAIL: ↓

CALCULATE THE MEAN RATE OF THE REVERSE DIRECTION DURING THE BULK TIME IN FORWARD DIRECTION
=> $r_{\text{reverse rate}}$ FIND $t_{B,l} > t_{F,\text{start}}$
=> l start index FIND $t_{B,r} > t_{F,\text{stop}}$
=> r -1 stop index $$r_{\text{reverse rate}} = \frac{\Sigma_{i=(1,r-1)} S_{B,i}}{t_{F,\text{stop}} - t_{F,\text{start}}}$$

FIG. 5

BANDWIDTH RESERVATION FOR MULTIPLE FILE TRANSFER IN A HIGH SPEED COMMUNICATION NETWORK

BACKGROUND OF THE INVENTION

1. Field of the Invention

The invention pertains to the transmission of data units over a communication network, predominantly over a high bitrate network operating in an asynchronous transfer mode (ATM). In particular, the invention is related to communication networks where data units are transmitted with constant bit rate (CBR).

2. Description of the Related Art

In known approaches file transfers are carried out e.g. using congestion controlled network services like the "Available BitRate (ABR) service" in ATM networks. In contrast to video-on-demand transmission, no resource (bandwidth) reservation is provided. That congestion control provides fair sharing of the available bandwidth of the underlying network. The portion of the available bandwidth a file transfer gets granted depends on the actual traffic load within the network, i.e. the currently active network users and their respective traffic generation. As a result, the delay of the file transfer can not be determined in advance and varies arbitrarily.

A first approach concerning dynamic bandwidth adaptation in a packet communications network where adaptation is accomplished during connection time, is disclosed in U.S. Pat. No. 5,359,593 (Docketno. RA993024) entitled "A Dynamic Bandwidth Estimation and Adaptation Algorithm" which is assigned to the present assignee. Therein proposed is a dynamic bandwidth updating mechanism which continuously monitors the mean bitrate of a signal source and the loss probability of the connection. Particulary that mechanism is only related to dynamic access control for acquisition of new connection bandwidth in case of necessary bandwidth updating when the connection parameters get out of pre-defined acceptable values.

A second known approach disclosed in U.S. Pat. No. 5,367,523 (Docketno. RA993005) entitled "Adaptive Rate Based Flow/Congestion Control Mechanism" which is also assigned to the present assignee, is in the field of congestion control. A mechanism is proposed which exchanges rate request and rate response messages between data senders and receivers to allow the sender to adjust the data rate to avoid congestion and to control the data flow. Requests and responses are piggy-backed on data packets and result in changes in the input data rate in a direction to optimize data throughput.

A further approach for capturing complex traffic behavior in a packet communications network which characterizes the traffic offered to a network is disclosed in U.S. Pat. No. 5,274,625 (Docketno. RA992017) entitled "A Method for Capturing Complex Traffic Behavior with Simple Measurements" assigned to the present assignee. A few parameters are used to characterize the traffic offered to the network, such as peak bit rate, mean bit rate and average packet burst length. Access control and bandwidth management are based on that equivalent burst length and produce improved decisions due to the more accurate representation of the actual traffic distribution.

Another approach of congestion control in a packet communications network with bandwidth allocation is disclosed in U.S. Pat. No. 5,289,462 (Docketno. RA991021) entitled "Setting the Congestion Control Parameters in Networks with Bandwidth Allocation" which is also assigned to the present assignee. There data packets are transmitted over multilink paths between two endnodes wherein at each node a representation of the traffic load is reserved for all connections on each transmission link. That representation particulary comprises a vector including the mean of the bit rate for all connections, the variance of the bit rate, and the sum of the equivalent bandwidths required to carry a connection if offered in isolation.

A method of load balancing in large-scale packet switched communication networks where bandwidth requirements are changed dynamically is further disclosed in an article by A. Herkersdorf and L. Heusler published in IBM Technical Disclosure Bulletin, edition 10, 1992, pages 435–438, and entitled "Load Balancing for Variable Sized Connections with Dynamically Changing Bandwidth Requirements". An algorithm is proposed which is based on the superposition of two independent basic mechanisms: Dynamic threshold adjustment according to some predefined criteria and a modified sequential algorithm with homing to distribute connections over multiple paths only up to a given threshold. The variable threshold is used to circumvent the undesirable behavior of the sequential hunting algorithm to allocate all available bandwidth on some paths while other paths are still untouched. This guarantees a certain margin for already routed connections to increase their bandwidth without exceeding the maximum path capacity. By the proposed mechanism both variable but fixed sized connections as well as connections with dynamically changing bandwidth requirements are supported. It is achieved further that an early saturation on some data paths is prevented and the network throughput under a given packet loss probability is maximized wherein the ens-to-end delay of the connection is minimized.

A bandwidth management method for ATM networks using a learning algorithm is disclosed in an article by B. Khasnabish and M. Ahmadi published in IEEE Proceedings of GLOBECOM '93, New York, volume 2, pages 1149–53 and entitled "Bandwidth Management/Policing in ATM Networks for Serving Multi-Category Traffic using a Simple Learning Algorithm and a Bucket Bank". The proposed method allows dynamically sharing of a pool of bandwidth by provision of multiple categories of traffic. The first category is CBR-type traffic for which only the maximum of the consumable bandwidth is defined, whereas for the other categories, a minimum portion of the overall bandwidth is guaranteed when they are sufficiently active. The remaining portion of bandwidth is dynamically shared on the basis of further parameters like a pre-assigned priority level.

A further known approach in the field of learning algorithms is disclosed in an article by J. R. Chen and P. Mars published in Conference Proceedings of IEE Eight UK Teletraffic Symposium held on April 1991, London, pages 18 ff. and entitled "Adaptive ATM Call Access Control using Learning Algorithms". It is particulary concerned with access control strategies based on learning algorithms. For bandwidth resource management in ATM it is proposed to utilize an adaptive statistical multiplexing control strategy.

Thereupon, in high speed wide area networks (WANs) the provision of a congestion controlled network service is unlikely with regard to the incidental high bandwidth delay, and thus a congestion controlled service like ABR will not be available in the WAN area between all end systems. Therefore the end systems of a WAN only can use a CBR service. Currently, the network itself is the bottleneck for file transmission so that the end systems which use a CBR service take the bandwidth they can have granted by the network, e.g. n×64 Kbps (bits per second). But in the future when high speed networks will offer more bandwidth than one end system can consume, the bandwidth of a CBR connection needs to be estimated in advance by taking the end system power into account. But the characterization of the end system power is a very difficult undertaking and depends on several situation specific parameters which rarely can be taken into account.

Other disadvantages of existing CBR services are that estimation of the bandwidth has to be done based on assumptions about end system power, configurations, etc. In case of a very conservative estimation, the duration of the file transfer will be too high. In case of a worst case reservation, an overallocation of resources occurs in many situations. Thus it is nearly impossible to estimate a value in advance that fits well in all situations. Further a single estimation is not adaptive to changes in the end system power caused by reconfigurations, etc.

SUMMARY OF THE INVENTION

It is thus an object of the invention to provide a method and a device to optimize bandwidth reservation in a communication network for more than one file transfers within a greater time period, between two dedicated end systems. Hereby the transfer delay should not depend on the available bandwidth within the network. The transmission should be as fast as possible, only limited by the end system power. In particular the mechanism sought after should run automatically without need of any interaction by the user.

According to the invention, the above objects are solved by the features of the independent method claim related to a mechanism for controlling bandwidth reservation by characterizing a given transmission path and learning the optimal bandwidth from the characterization results, and related to two particular methods for characterizing traffic and learning bandwidth parameters. A further independent claim is related to a specific control device which implements the proposed bandwidth reservation process.

The underlying concept of the invention is a methodology to optimize the bandwidth reservation for file transfer between endsystems interconnected via a telecommunication network where an end system can learn the optimal reservation bandwidth for the transmission to each destination system. It should be noted that the invention is related to interconnection optimization between different file transfer phases, and not to online learning. In detail, a respective data path is observed during the transmission phase, for instance by recording a packet trace. From that information the used bandwidth and the level of utilization are determined (traffic characterization). The according result learned by calculating the optimal bandwidth is stored in a memory until a next file transfer to the same end system is requested. Thus for a following transmission of e.g. another data unit the learned and optimized reservation can be utilized.

The advantage of that optimization procedure is the high throughput, i.e. short delay, by keeping a high bandwidth utilization with regard to low overallocation. The user does not have to estimate a vague value for the bandwidth reservation. Beyond this, the system is adaptive so that after a reconfiguration the new optimal bandwidth is learned again.

In particular, the learning method is performing defensively with respect to the proposed slight adaptation to avoid "outshoot" effects which may caused by too fast decreases of the reserved bandwidth. The integer n should be advantageously chosen to be in the order of "20" that it can be stored within 1 byte storage area. One of those bits is reserved for the utilization state and the remaining bits for the state count. A further advantage of that implementation is that the ATM parameters, i.e. the data resulting from the learning process (transmission rate), can be simply retrieved from ATM and stored in action cases. The transmission rate provided by ATM is "cells/s".

It is noted that the present invention can be advantageously implemented in a high speed (high bitrate) digital network like ATM running in a non real-time, variable bit rate CBR mode, or a (nrt-VBR) service that is also possible if used as a CBR service, but can also be used in other networks like analog telecommunication networks.

BRIEF DESCRIPTION OF THE DRAWINGS

In the following a preferred embodiment of the invention is described in more detail with reference to the accompanying figures, where

FIG. 4 illustrates by two flow charts the characterization step of the present invention, the lefthand chart depicting an overview of bulk rate determination, and the righthand chart depicting a detailed description of the underlying algorithms;

FIG. 5 illustrates the characterization step of FIG. 4 for reverse rate during bulk transmission;

DETAILED DESCRIPTION OF THE INVENTION

The invention particulary addresses communication networks which provide high bandwidth connections, like ATM. A pre-requisite of learning optimal bandwidth is that more than one file is transferred between two dedicated end systems within a greater time period, i.e. multiple file transfers between the same end systems. Two scenarios are the primary objective of the invention, first an application program which has to transfer files under the restriction that the transfer delay does not depend on the available bandwidth within the network, i.e. the transmission should be as fast as possible, only limited by the end system power where no ABR service is wanted. Another scenario is the field where an ABR service is not available at all and a CBR service has to be used, especially in the WAN area.

Figure 1:
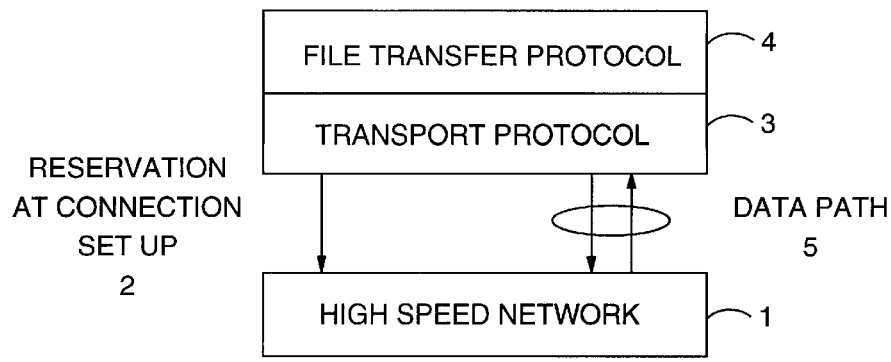
FIG. 1 is a schematic block diagram of an end system architecture according to the prior art to which the present invention can be applied.

The principle architecture of an end system using a CBR service in a high speed network 1 is shown in FIG. 1. First, bandwidth reservation at connection set up 2 is accomplished by a transport protocol 3 which opens a high speed connection by providing a value for the desired CBR bandwidth. The transport protocol relates to the layer "4" in the network reference model and is used for the invention to provide error free transmission of data units. It checks the data by calculating a check sum and initiating a re-transmission if a packet gets lost or corrupted. The transport protocol 3 is controlled by a file transfer protocol 4 of the respective application program. The file transfer protocol belongs to the application layer. It operates directly over TCP and performs the tasks needed for the file transfer (e.g. open file pointer, open TCP connection, authentication, read/write rights). Thereafter the data is transferred over an according data path 5 of the network 1.

Figure 2:
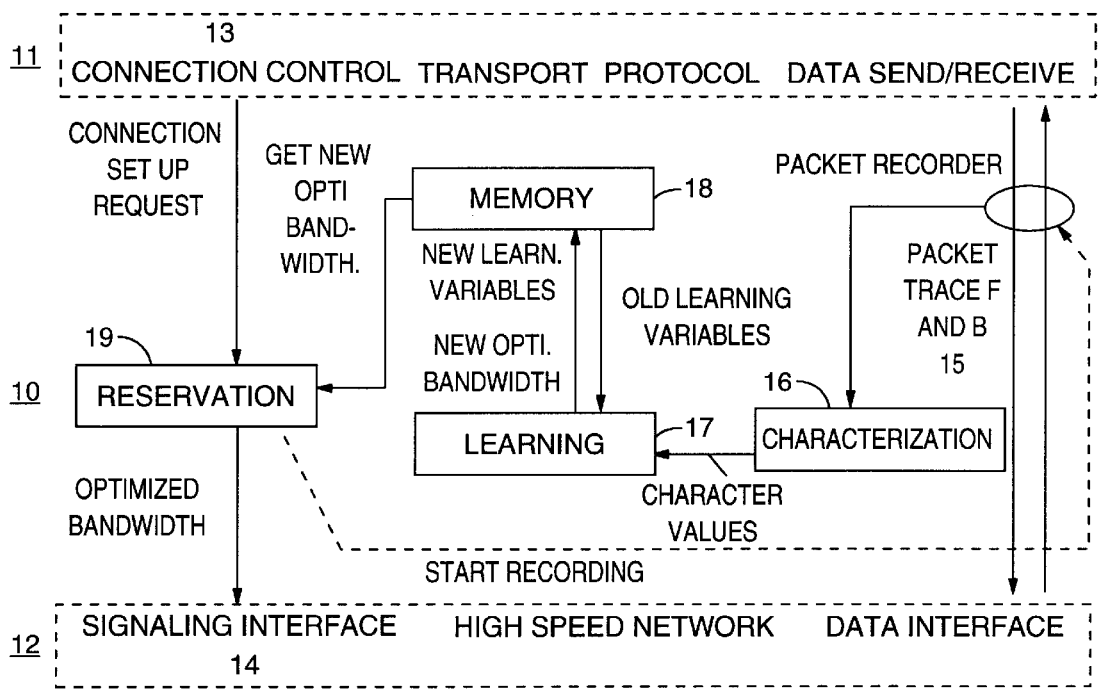
FIG. 2 is a schematic view of an exemplary architecture of a learning system according to the invention.

FIG. 2 depicts an architectural view of a learning system according to the present invention. It shows an intermediate level 10 between a transport protocol level 11 and a network level 12 of a high speed network. The lefthand signal line is concerned with connection control 13 between the transport protocol 11 and a signalling interface 14 of the network and corresponds to the arrow 2 in FIG. 1. The righthand signal lines 15 depict the data paths for file transfer in the forward and backward direction according to data path lines 5 in FIG. 1.

A first essential step of the proposed mechanism is to trace 15 packets "B" and "F" of file transfer in backward and forward transfer direction. In order to characterize 16 appropriately the sent and received data, the packet trace must be recorded below the transport protocol level right before the network buffer, because the transport protocol is the lowest layer in the configuration (TCP over ATM) that changes the traffic characteristic before the packets are given to the traffic shaper of the ATM network. This traffic shaper is programmed with bandwidth reservation value, so that the traffic stream at this point should fit to the bandwidth reservation. The real traffic dynamics seen by the network adaptation, e.g. the known "traffic shaper" tool in ATM, are traced. After recording and characterization a learning process 17 is invoked. This process uses the characterization results and the learning values stored in a memory 18 to determine the next bandwidth reservation 19 value needed for the following file transfer to the same destination end system. This value is stored until the next file transfer is requested.

1. Bandwidth Characterization

Figure 3:
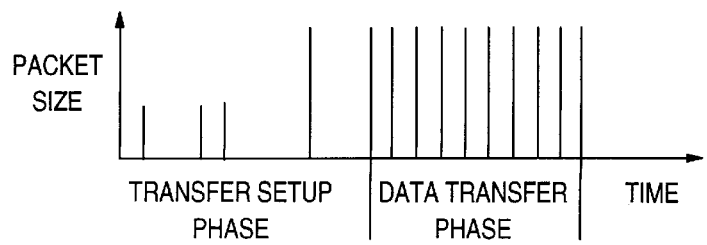
FIG. 3 depicts a typical packet trace of a file transfer.

A "packet recorder" provided by the operating system, especially the network device driver of the underlying network, allows tracing of transferred data units (files). The packet recorder traces each packet with the packet size and a time stamp. The characterization module has to evaluate the packet data. The characterization gets a packet trace for forward F and backward B direction from the recorder. A typical packet trace of a file transfer is depicted in FIG. 3 where the transmission is represented by a list of (time stamp $t_i$, packet size $S_i$) entries.

The characterization determines the necessary bandwidth which is used in the data transfer phase. Hereby the transfer setup phase and the transfer start-up have to be ignored since they would falsify the results. Analogously possible restarts within the data transfer phase ("re-transmission stops") have to be ignored. If the transport protocol detects a packet loss, it has to invoke a re-transmission of that packet. Otherwise the data is not complete. Depending on the protocol details some transfer protocols stop the transmission of further data until the missing packet is received after the request (like TCP). This is a transmission stop because of a pending re-transmission and thus called a re-transmission stop. Other transport protocols do not stop the transmission, if just one packet is requested for retransmission. They store the received packets in a buffer until the requested packet is received. The buffering in needed, because the sequence order must be provided. If several packets get lost or the buffer is full all transport protocols will stop there transmission. In particular it is tried to detect "end system at limit" effects at a maximum utilization level. The bandwidth in the reverse direction has to be determined with respect to acknowledge signals issued by the destination system.

In more detail, the characterization method determines the bulk rate (the bulk rate is the mean rate over the bulk time without the re-transmission stops, like defined in FIG. 4) the reverse rate during bulk transmission, and performs a detection of "end system at limit" effects, i.e. an end system transmits or receives data close to their maximum rate and thus transmission rate begins to vary instead of keeping flat limited by the reserved rate in the network These features are illustrated by the two flow charts shown in FIG. 4, where the lefthand chart depicts an overview of bulk rate determination. After determination of the begin and the end of a bulk it is checked for retransmission stops in the bulk. For those stops, the respective packet trace is "cleaned" by removing time gaps. From these cleaned traces the mean rate over bulk time is determined. The righthand chart provides a detailed description of the underlying algorithms.

In reverse direction the needed bandwidth is much lower than in forward direction. Furthermore the bandwidth should not be selected too small to avoid an influence on the forward transmission speed. Therefore, an overreservation must be provided which in turn does not force a quite exact rate determination.

The reverse rate is calculated from the 'cleaned' backward packet trace that is corresponding to the forward trace. From this 'cleaned' trace the reverse rate during bulk time is the mean rate over the bulk time in forward direction (see FIG. 5 for details).

Figures 6, 7:
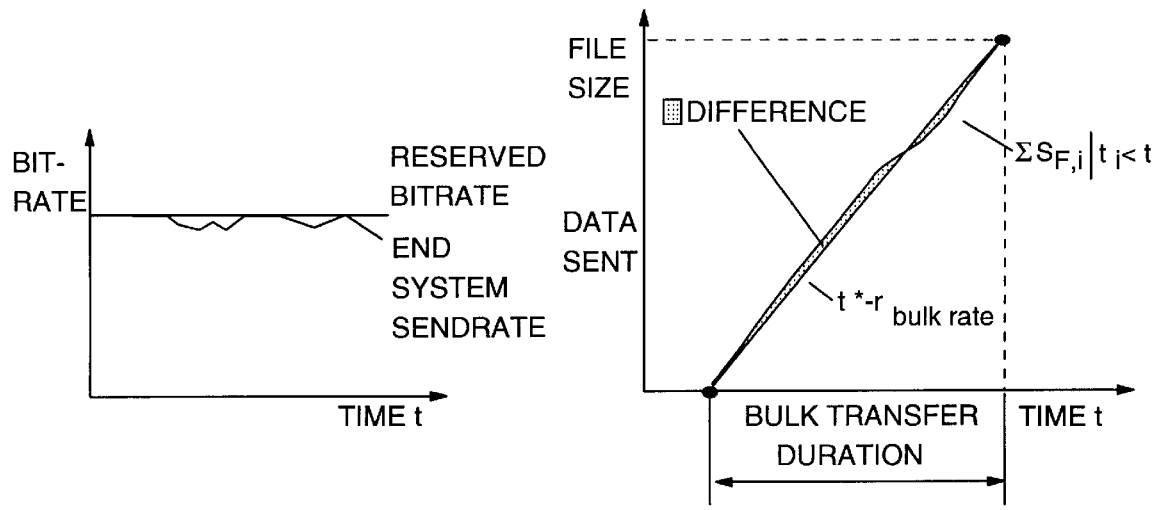
FIG. 6, 7 illustrate a particular mechanism of checking for "end system at limit" effects.

The characterization method for the end system at limit effect calculates the maximum difference between the simulated buffer fill level based on the packet trace and the continuous filling based on the mean rate (see FIG. 6). If the real rate is flat, the difference will be low. If the real rate begins to vary (like shown in the left picture of FIG. 6), the difference increases quite quick. (See FIG. 7 for details in algorithm).

2. Learning Mechanism for Forward Direction

The learning of an optimal bandwidth in forward file transfer direction is influenced by the feedback reaction of the underlying transport flow control mechanism, like the known TCP flow control. The flow control of TCP is an algorithm to adjust the sending rate to the available rate along the network path or the receiving rate. If this flow control runs over a connection with bandwidth reservation the sending speed is increased—by the flow control algorithm—close the reserved rate or up to the limit of the end systems. The learning concept based on the following observations: If a reservation is too low, near 100% connection utilization is provided; if a reservation is appropriate ("o.k.") then also near 100% connection utilization is achieved; and if a reservation is too high then a lower connection utilization or an "end system at limit" situation are possible. It should be noted that the states "too low" and "o.k. can not be distinguished by characterization.

The learning mechanism is based on the former reservation characteristics being stored in a memory and the actual characterization value. The following exemplary pseudo code illustrates this.

Learning Algorithm

The learning process depend on the former reservation characteristics (i.e. state of former reseravation and duration of former state) and the actual characterization values.

```
Internal state:     last = 'too_high' or 'ok'   /* result of last file transfer */
Internal variable:  n                            /* state 'last' hasn't changed for n times */
Input:    if(effect=TRUE or utilization < γ) then rate_too_high /* γ may be 90% */
          else rate_ok
Output:   next bandwidth reservation value R_{n+1}
          updated internal variable n
          internal state last = state of input
Start Values: last = 'ok'
              n = k                              /* k may be 5, α may be 1.02 */
```

The respective actions which have to be performed based on the above states are summarized in the following table.

| state last | input | count n | action overview | action in detail |
|---|---|---|---|---|
| last = ok | rate_ok | n < k | linear increase, n++ | ● $R_{n+1} = \alpha * R_n$ <br> ● n++ |
|  |  | n >= k | exponential increase | ● $R_{n+1} = R_n * [1+(\alpha -1)*2^{n-k+1}]$ <br> ● n++ |
|  | rate_too_high | n <= k | slight decrease | ● $R_{n+1} = (3*0.9\ R_n + r_{bulk\ rate,n})/4$; $r_{bulk\ rate,n} < 0.9*R_n$ <br> $= r_{bulk\ rate,n}$; $r_{bulk\ rate,n} > 0.9*R_n$ |
|  |  | n > k | use measured rate | ● $R_{n+1} = r_{bulk\ rate,n}$ |
| last = too_high | rate_ok | — | start linear increase | ● $R_{n+1} = \alpha * R_n$ <br> ● n = 1 |
|  | rate_too_high | — | decrease | ● $R_{n+1} = (0.9\ R_n + r_{bulk\ rate,n})/2$; $r_{bulk\ rate,n} < 0.9*R_n$, <br> $= r_{bulk\ rate,n}$; $r_{bulk\ rate,n} > 0.9*R_n$ |

3. Learning Mechanism for Backward Direction

In backward direction the bandwidth is low compared with the forward direction. The learning process for backward direction is based on the observation that also a too low reservation in backward direction can reduce the transfer speed in forward direction e.g. with regard to the necessary acknowledgement signals issued by the destination side. Therefore the learning principle in backward direction is to select the respective bandwidth with a high security gap.

The hereinafter pseudo code illustrates that situation.

The following catalogue gives only an impression of the spectrum of embodiments of the present invention. At least five implementation variations are possible:

a) As part of a high speed network application program which has its own transport protocol where that application optimizes its use of the network resources;

b) a "stand-alone" framework which can be built in an application wherein no changes of the application itself are required and wherein the framework provides the optimization for the application;

```
Internal variable:    R̄_back
Input:                r_reverse rate,n
Output:               next reverse bandwidth value R_{rev,n+1}
                      new intern value R̄_{back,n+1}
Start Value:          R̄_{back,1} = a
Actions:
overview:             detail:
```

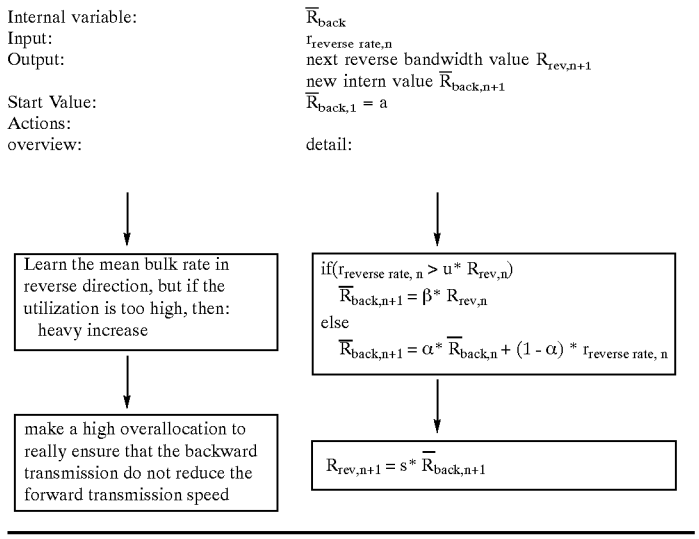

| Learn the mean bulk rate in reverse direction, but if the utilization is too high, then: heavy increase | if($r_{reverse\ rate,n} > u * R_{rev,n}$) <br>   $\overline{R}_{back,n+1} = \beta * R_{rev,n}$ <br> else <br>   $\overline{R}_{back,n+1} = \alpha * \overline{R}_{back,n} + (1 - \alpha) * r_{reverse\ rate,\ n}$ |
|---|---|
| make a high overallocation to really ensure that the backward transmission do not reduce the forward transmission speed | $R_{rev,n+1} = s * \overline{R}_{back,n+1}$ |

α learning value (e.g. 0.8)
β heavy increase (e.g. 2)
u utilization limit (e.g. 0.9)
s overallocation (e.g. 4)

c) as an extension of a transport protocol like TCP that runs over a high speed network, which can be implemented without interface changes or with a slight extended interface that provides the means for the control of the optimization;

d) as an extension of a high speed network interface, i.e. a particular service (similar to c) but provided below the transport protocol); or e) if a user has a packet oriented access line to a high speed network, this invention can be implemented in a network access node providing an intelligent service for the user through the network.

Further the concepts of the invention can be used for backup tools for data backups, for data distribution programs like catalog updates and data base updates, for data retrieval programs like medical images, infos, news, files, or stored video files, and for all file transfer operations that transfer large files more than once to one destination. It can be advantageously used for bandwidth reservation for file transfer between servers of different companies over networks provided by the companies themselves. The underlying algorithm can be run automatically in the background i.e. non-visible to the user.

I claim:

1. A method for controlling bandwidth reservation in a communication network (1) for constant-bitrate transmission of data units between two endnodes over a transmission line (5), characterized by the steps of tracing (15) said transmission line during transmission of a data unit between said endnodes;

determining (16) the bandwidth utilization of said transmission line;

calculating (19) a bandwidth value for the following transmission of a data unit between said endnodes which is based on said bandwidth utilization;

storing (18) said bandwidth value up to said following transmission;

wherein calculation of a new bandwidth value is based on said determined bandwidth utilization and said stored bandwidth value.

2. Method according to claim 1, wherein said step of tracing is accomplished by recording the packet trace of the network.

3. Method according to claim 1 or 2, where said steps are executed as a loop to allow adaptive learning.

4. Method according to claim 1 or claim 2, which is characterized by the steps of recording a packet trace between a transport protocol level (3, 11) of the network and a network buffer (12);

characterizing (16) the actual bandwidth by determining the rate for bulk transmission, the reverse rate during bulk transmission, and by detecting endnode at limit conditions;

storing the characterization results in a memory (18) until a next file transfer to the same endnode;

learning (17) of a next bandwidth reservation value by use of the characterization results and the learning values stored in said memory.

5. A method of characterizing (16) the bandwidth utilization of a communication network for the transmission of data units between two endnodes of said network, characterized by the steps:

tracing (15) the transmission rate for a data unit to provide a transmission trace;

tracing the reverse transmission rate during said transmission and determining a respective mean transmission rate for said reverse transmission; and checking for limit conditions of the endnodes by determining the maximum difference between the actual sent data and an extrapolated value calculated by use of said mean transmission rate.

6. Method according to claim 5, where said step of tracing comprises the further steps of determining the start time and the end time of the transmission, checking for re-transmission interruptions in said transmission, reducing the transmission trace by removing time gaps, and calculating the mean transmission rate for said reduced transmission trace.

7. A device for controlling resource reservation for transmission of data units between two endnodes in a communication network (1), characterized by packet recording means (15) for recording a packet trace during transmission of a data unit;

means (16) for generating characterization parameters for said packet trace;

means (19) for determining resource reservation from said characterization parameters, and for delivering new learning parameters and optimized bandwidth values;

memory means (18) for storing said parameters and values and delivering said values at a next transfer of data unit between the same endnodes.

* * * * *